(12) United States Patent
Uehara et al.

(10) Patent No.: US 10,173,498 B2
(45) Date of Patent: Jan. 8, 2019

(54) VEHICLE AIR CONDITIONING SYSTEM

(71) Applicant: Nissan North America, Inc., Franklin, TN (US)

(72) Inventors: Takafumi Uehara, Mexico City (MX); Yoshitomo Fukutomi, Saitama (JP)

(73) Assignee: Nissan North America, Inc., Franklin, TN (US)

( * ) Notice: Subject to any disclaimer, the term of this patent is extended or adjusted under 35 U.S.C. 154(b) by 194 days.

(21) Appl. No.: 15/188,246

(22) Filed: Jun. 21, 2016

(65) Prior Publication Data
US 2017/0361680 A1    Dec. 21, 2017

(51) Int. Cl.
*B60H 1/32* (2006.01)
*B60H 1/00* (2006.01)

(52) U.S. Cl.
CPC ......... *B60H 1/323* (2013.01); *B60H 1/00764* (2013.01); *B60H 1/00842* (2013.01); *B60H 1/321* (2013.01); *B60H 2001/3245* (2013.01); *B60H 2001/3255* (2013.01); *B60H 2001/3261* (2013.01); *B60H 2001/3266* (2013.01); *B60H 2001/3272* (2013.01)

(58) Field of Classification Search
CPC .... B60H 1/323; B60H 1/321; B60H 1/00764; B60H 1/00842; B60H 1/00785; B60H 2001/3245; B60H 2001/3255; B60H 2001/3261; B60H 2001/3266; B60H 2001/3272
See application file for complete search history.

(56) References Cited

U.S. PATENT DOCUMENTS

| | | | | |
|---|---|---|---|---|
| 4,473,109 A | * | 9/1984 | Kojima | B60H 1/00814 165/203 |
| 4,850,204 A | * | 7/1989 | Bos | F25B 47/025 62/156 |
| 6,640,566 B2 | * | 11/2003 | Mardberg | B60H 1/00785 62/156 |
| 2012/0252340 A1 | * | 10/2012 | Gannon | B60H 1/00028 454/75 |
| 2014/0202185 A1 | * | 7/2014 | Wong | B60H 1/321 62/89 |

* cited by examiner

*Primary Examiner* — Jianying Atkisson
*Assistant Examiner* — Tavia Sullens
(74) *Attorney, Agent, or Firm* — Global IP Counselors, LLP

(57) ABSTRACT

A first sensor measures temperature at a first evaporator that cools a first zone. A second sensor measures temperature at a second evaporator that cools a second zone. A controller operates a compressor in a normal cooling mode or a single zone cooling mode. In the normal cooling mode, both the first zone and the second zone are cooled with the compressor operated by the controller in response to temperature measurements from one or both of the first sensor and the second sensor. In the single zone cooling mode, only the second zone is cooled with the compressor controlled by the controller in response to temperature measurements from the second sensor and the controller determining that the first evaporator has a low probability of accumulating frozen moisture on surfaces thereof, and in response to determining a high probability of accumulating frozen moisture on surfaces thereof the compressor is not operated.

14 Claims, 6 Drawing Sheets

VEHICLE AIR CONDITIONING SYSTEM

BACKGROUND

Field of the Invention

The present invention generally relates to a vehicle dual zone air conditioning system. More specifically, the present invention relates to vehicle dual zone air conditioning system with a first evaporator for a first zone and a second evaporator for a second zone where both first and second evaporators are provided with unimpeded flow of compressed refrigerant from a condenser while the compressor is operating.

Background Information

A vehicle dual zone air conditioning system is typically provided with a first evaporator for a first zone thereof and a second evaporator for a second zone thereof with at least one refrigerant flow shut-off valve installed between a condenser and at least one of the first evaporator and the second evaporator in order to selectively stop the flow of refrigerant to the one of the first and second evaporators when there is no cooling requested for that zone.

SUMMARY

One object of the disclosure is to control a dual zone air conditioning system in the absence of a refrigerant flow shut-off valve between a compressor and both a first evaporator of a first zone and a second evaporator zone of a second zone.

Another object of the disclosure is to control a dual zone air conditioning system with logic that prevents freezing of moisture on surfaces of a first evaporator and a second evaporator.

In view of the state of the known technology, one aspect of the present disclosure is to provide a vehicle air conditioning system having a first evaporator, a second evaporator, a compressor, a first sensor, a second sensor, a control panel and a controller. The first evaporator is configured to provide cooling to a first zone within a vehicle. The second evaporator is configured to provide cooling to a second zone within the vehicle. The compressor is configured to provide compressed refrigerant simultaneously to both the first evaporator and the second evaporator. The first sensor measures temperature at the first evaporator and the second sensor measures temperature at the second evaporator. The control panel is configured for receiving manually set air conditioning operation settings, including separate settings for cooling of the first zone and settings for cooling of the second zone. The controller is connected to the first sensor, the second sensor, the compressor and the control panel. The controller is configured to operate the compressor in a plurality of differing modes, including:
  a normal cooling mode where cooling of both the first zone and the second zone is requested via the control panel, such that the compressor is operated by the controller in response to temperature measurements from one or both of the first sensor and the second sensor, and
  a single zone cooling mode in which cooling of only the second zone is requested via the control panel, with the compressor being controlled by the controller in response to temperature measurements from the second sensor and the controller determining that the first evaporator has a low probability of accumulating frozen moisture on surfaces thereof, and in response to the compressor determining a high probability of accumulating frozen moisture on surfaces thereof the compressor is not operated.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
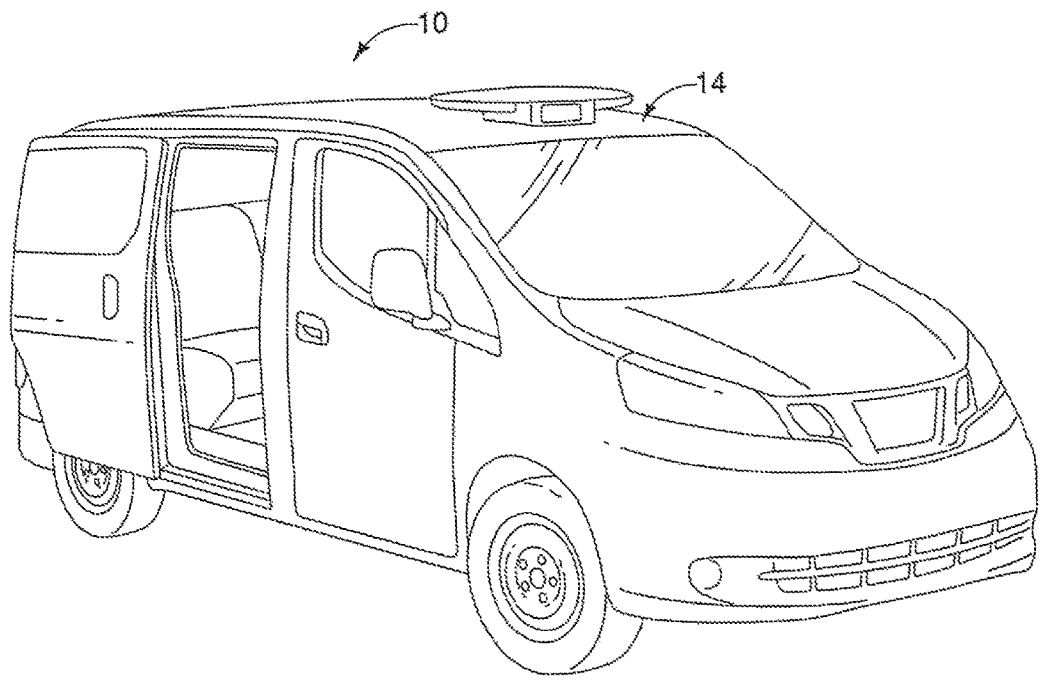
FIG. 1 is a perspective view of a vehicle having a passenger compartment divided into a first zone and a second zone, and a dual zone air conditioning system in accordance with a first embodiment.
Figure 2:
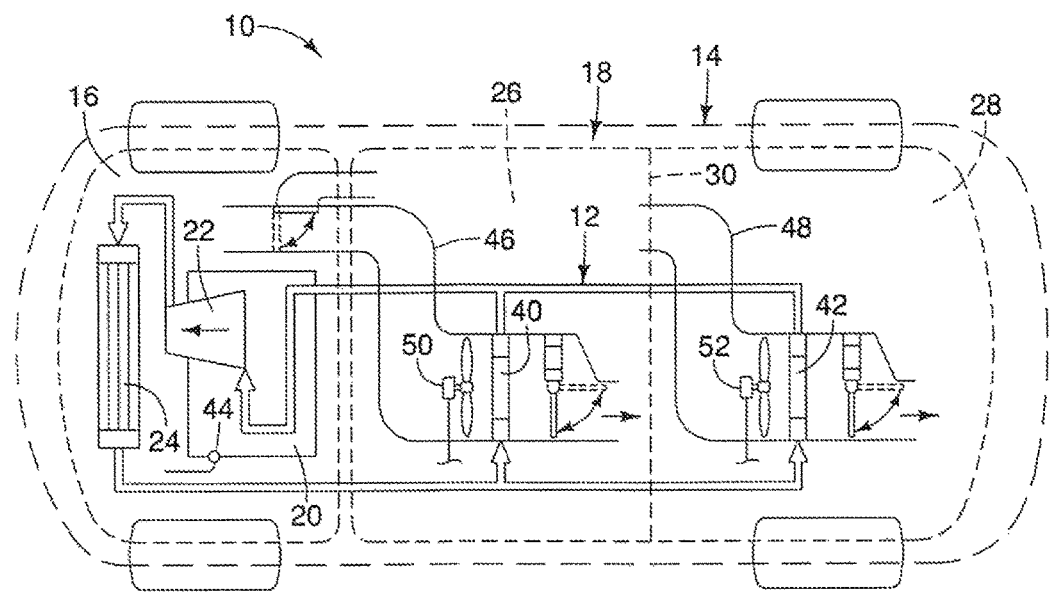
FIG. 2 is a schematic view of the vehicle showing an engine compartment, the first zone of the passenger compartment, the second zone of the passenger compartment and elements of the air conditioning system in accordance with the first embodiment.

Referring initially to FIGS. 1 and 2, a vehicle 10 with an air conditioning system 12 (FIG. 2) with independently operable dual zones is illustrated in accordance with a first embodiment.

As shown in FIG. 2, the vehicle 10 includes a vehicle body structure 14 that defines an engine compartment 16 and a passenger compartment 18. The engine compartment 16 includes a power plant 20, a compressor 22 powered by the power plant 20 and a condenser 24. The power plant 20 can be an electric motor, an internal combustion engine, such as a diesel engine or gasoline powered engine, or a hybrid engine that includes both an electric motor and an internal combustion engine. Since such power plants are conventional features, further description is omitted for the sake of brevity. The compressor 22 and the condenser 24 are part of the air conditioning system 12, which is described in greater detail below.

The passenger compartment 18 is divided into a first zone 26 and a second zone 28 by, for example, a partition 30. The first zone 26 is a forward section of the passenger compartment 18 that includes a front seat or seats (not shown) and operator controls (not shown) such as a steering wheel (not shown), brake and accelerator controls. Since front seat(s) and operator controls of a vehicle are conventional features, further description is omitted for the sake of brevity. The second zone 28 is a passenger section of the passenger compartment 18 rearward from the first zone 26. The passenger compartment 18 is configure for use as, for example, a taxi or limousine where a driver is separated from passengers, where the partition 30 separates the first zone 26 from the second zone 28. Alternatively, the passenger compartment 18 can be conventional vehicle passenger compartment in the absence of the partition 30, where the conventional vehicle includes a dual zone air conditioning such as the air conditioning system 12 that provides cooling to areas of the vehicle 10 that are not divided by a partition or wall.

Figure 3:
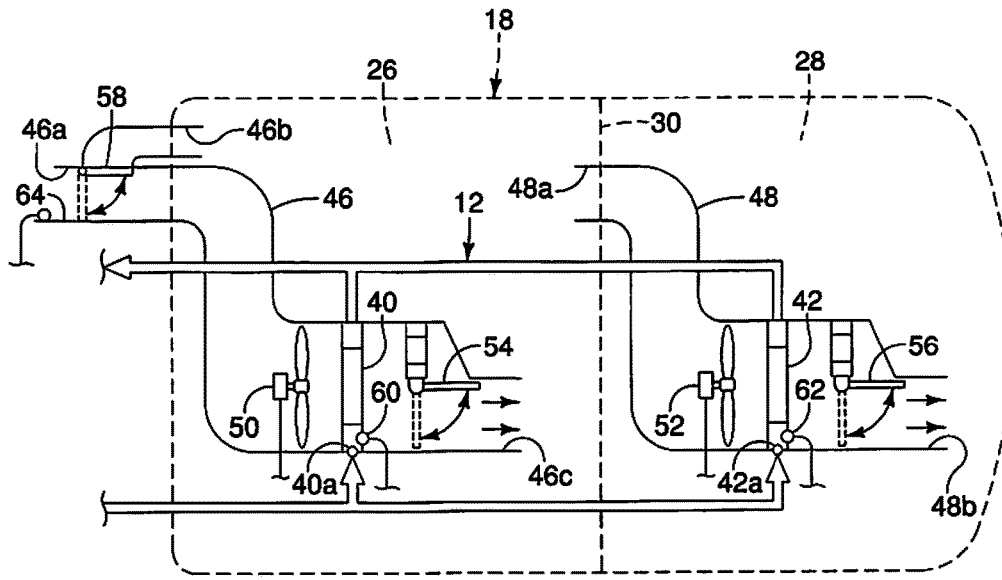
FIG. 3 is a schematic view of a portion of the vehicle and elements of the air conditioning system showing a first air handler with a first evaporator and a recirculation door, a second handler with a second evaporator in accordance with the first embodiment.
Figure 4:
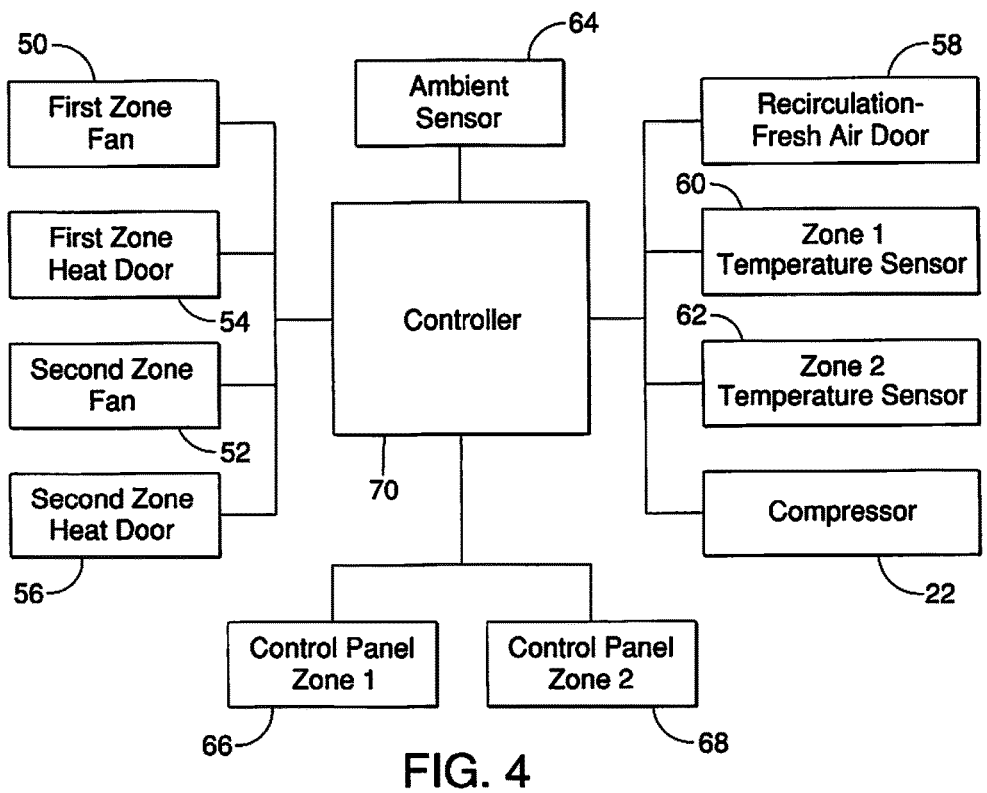
FIG. 4 is a block diagram showing various elements of the air conditioning system depicted in FIG. 3, including a controller in accordance with the first embodiment.

The air conditioning system 12 is shown in FIGS. 2, 3 and 4, and includes the compressor 22, the condenser 24, a first evaporator 40 (for the first zone 26), a second evaporator 42 (the second zone 28), a first air handler 46 (the first zone 26), a second air handler 48 (the second zone 28), a first fan 50, a second fan 52, a first heat door 54 (the first air handler 46), a second heat door 56 (the second air handler 48), a recirculation door 58 (the first air handler 46), a first temperature sensor 60, a second temperature sensor 62, ambient condition sensor 64, a first control panel 66, a second control panel 68 and a controller 70.

As shown in FIG. 2, the compressor 22 is located in the engine compartment 16 and is provided with power by the power plant 20 in a conventional manner. The compressor 22 is configured to compress refrigerant received from a downstream side of the first evaporator 40 and a downstream side of the second evaporator 42. The compressor 22 is connected to the condenser 24 provide compressed refrigerant to the condenser 24. The condenser 24 is installed within the engine compartment 16 in order to dissipate heat produced by the compressing of refrigerant by the compressor 22. The first evaporator 40 has an upstream side with a refrigerant expansion device 40*a* integrated therein. The second evaporator 42 has an upstream side with a refrigerant expansion device 42*a* integrated therein. The refrigerant expansion devices 40*a* and 42*a* are preferably automatic devices that automatically release compressed refrigerant into the first and second evaporators 40 and 42 at a pressure that is lower than the pressure exiting the condenser 24.

It should be understood from the drawings and description herein that the refrigerant expansion devices 40*a* and 42*a* are not valves per se, and can be, for example, orifice tubes. Specifically, the refrigerant expansion devices 40*a* and 42*a* are refrigerant flow restricting devices and are not configured to completely stop the flow of refrigerant. Rather, the refrigerant expansion devices 40*a* and 42*a* are refrigerant flow restriction devices that limit flow of refrigerant without stopping the flow of refrigerant, such that pressure on an upstream side of each of the refrigerant expansion devices 40*a* and 42*a* is greater than the refrigerant pressure on a downstream side of the refrigerant expansion devices 40*a* and 42*a*. Since expansion devices are conventional features of air conditioning systems, further description is omitted for the sake of brevity.

Refrigerant from the condenser 24 is directly fed to each of the first evaporator 40 and the second evaporator 42. More specifically, the condenser 24 is directly connected to the expansion device 40*a* and the expansion device 42*a* in order to supply an uninterrupted flow of cooled compressed refrigerant to both the first expansion device 40*a* and the second expansion device 42*a* while the compressor 22 is operating in the absence of any intervening valve or flow interruption device. In other words, refrigerant is provided to both the first evaporator 40 and the second evaporator 42 at all times from the condenser 24 during operation of the compressor 22. Similarly, refrigerant leaving each of the first and second evaporators 40 and 42 is provided uninterrupted to the compressor 22 (in the absence of any mechanical valve or refrigerant flow shut off device).

The first evaporator 40 (for the first zone 26) is disposed within the first air handler 46 in a conventional manner, along with the first fan 50, a heater core, and the first heat door 54. The first air handler 46 has a fresh air inlet 46*a*, a recirculation air inlet 46*b* and an outlet 46*c*. The fresh air inlet 46*a* is positioned to draw in fresh air from outside the vehicle 10. The recirculation air inlet 46*b* is positioned to draw air into the first air handler 46 from the passenger compartment 18. In the depicted embodiment, the recirculation air inlet 46*b* draws air into the first air handler 46 from the first zone 26 of the passenger compartment 18. The outlet 46*c* is positioned to expel air from the first air handler 46 into the first zone 26 of the passenger compartment 18. The recirculation door 58 is a remotely controlled door that moves between two positions. In a first position shown (also referred to as a fresh air position) in solid lines in FIG. 3, the recirculation door 58 blocks the recirculation air inlet 46*b* such that only fresh air is drawn into the first air handler 46 via the fresh air inlet 46*a*. In a second position (also referred to as a recirculation position) shown in dashed lines in FIG. 3, the recirculation door 58 blocks the fresh air inlet 46*a* such that air is drawn into the first air handler 46 via the recirculation air inlet 46*b* from the passenger compartment 18.

It should also be understood from the drawings and the description herein that operation of the recirculation door 58 can be controlled by the controller 70, or can be manually positioned by a vehicle passenger using, for example, a conventional lever and cable arrangement. Since manually operated lever and cable control mechanisms are well known, further description is omitted for the sake of brevity.

The first air handler 46 also includes the first temperature sensor 60. In the depicted embodiment in FIG. 3, the first temperature sensor 60 is installed on a downstream side of the first evaporator 40. However, the first temperature sensor 60 is preferably installed within the first air handler 46 downstream side of and is close to or in contact with the first evaporator 40. The first temperature sensor 60 is configured to measure the temperature of the air cooled by the first evaporator 40 as the cooled air is blown by the first fan 50 into the first zone 26 of the passenger compartment 18. However, in the depicted embodiment, the first temperature sensor 60 is configured to measure the temperature at the first evaporator 40 providing an indication of the temperature of the first evaporator 40 itself. As will be understood from the description below, one of the purposes of the first temperature sensor 60 is to provide the controller 70 with an indication of whether or not the first evaporator 40 is below the freezing point of water and is likely to have ice formed on its cooling surfaces.

The second evaporator 42 (for the second zone 28) is disposed within the second air handler 48 in a conventional manner, along with the second fan 52, a second heater core, and the second heat door 56. The second air handler 48 has an air inlet 48a and an outlet 48b. The air inlet 48a is positioned to draw in air from first zone 26 of the passenger compartment 18. The outlet 48b is positioned to expel air from the second air handler 48 into the second zone 28 of the passenger compartment 18.

The second air handler 48 also includes the second temperature sensor 62. In the depicted embodiment in FIG. 3, the second temperature sensor 62 is installed on a downstream side of the second evaporator 42. Preferably, the second temperature sensor 62 is installed within the second air handler 48 downstream side of and is adjacent to or in contact with the second evaporator 42. The second temperature sensor 62 is configured to measure the temperature of the air cooled by the second evaporator 42 as the cooled air is blown by the second fan 52 into the second zone 28 of the passenger compartment 18. However, in the depicted embodiment, the second temperature sensor 62 is configured to measure the temperature of the second evaporator 42 itself. As will be understood from the description below, one of the purposes of the second temperature sensor 62 is to provide the controller 70 with an indication of whether or not the second evaporator 42 is below the freezing point of water and is likely to have ice formed on its cooling surfaces.

The structure and operation of the first and second heat doors 54 and 56 are conventional. Therefore, operation of first and second heat doors 54 and 56 and corresponding heater cores is omitted for the sake of brevity.

The air conditioning system 12 can also include a speed sensor 44 and an ambient condition sensor 64. The speed sensor 44 is connected to the power plant 20 and/or drive train (not shown) of the vehicle 10, such that the speed sensor 44 provided detected vehicle speed to the controller 70. The ambient condition sensor 64 is installed to the air inlet 46a of the first air handler 46 such that the ambient condition sensor 64 can detect an ambient condition of air from outside the passenger compartment 18. In the first embodiment, the ambient condition sensor 64 is a temperature sensor that measures the temperature of air entering the first air handler 46. As is explained further below, in the second embodiment, the ambient condition sensor 64 is a humidity sensor. It should be understood from the drawings and the description herein that the ambient condition sensor 64 can be within the first air handler 46, or outside of the first air handler 46, so long as the ambient condition sensor 64 is positioned to make accurate measurements of at least one ambient condition outside of the vehicle 10. In the first embodiment, the ambient condition sensor 64 measures the temperature of fresh air outside of the vehicle 10 as it enters the first air handler 46. The ambient condition sensor 64 can be connected to the controller 70 providing signals indicating the temperature levels of air entering the first air handler 46.

As shown in FIG. 4, the first control panel 66 and the second control panel 68 are connected to the controller 70. The first control panel 66 is located within the first zone 26 of the passenger compartment 18 and includes conventional mechanisms and/or electronic hardware configured to receive heat and air conditioning settings manually set by a vehicle operator and/or vehicle passenger in the first zone 26. The second control panel 66 can be located within the second zone 28 of the passenger compartment 18 and includes conventional mechanisms and/or electronic hardware configured to receive heat and air conditioning settings manually set by a vehicle passenger in the second zone 28. Alternatively, the second control panel 68 can be located in the first zone 26 such that only the vehicle operator can change the settings of heat and air conditioning of the second zone 28. In a further alternative configuration, the first and second control panels 66 and 68 can be configured as a single control panel located within the first zone 26, but configured to change heat and air conditioning settings for both the first zone 26 and the second zone 28. Although not shown, the speed sensor 44 is also connected to the controller 70 and is used for conventional operations that are not necessary for understanding the logic presented below in FIGS. 5-8.

The first control panel 66 and the second control panel 68 are configured to receive manually inputted of respective settings for heating and cooling of the first zone 26 and the second zone 28. For instance, the first and second control panels 66 and 68 each include switches and/or electronic panels that allow a passenger to set speeds of the first fan 50 and the second fan 52; select a heat mode or a cooling mode for respective ones of the first zone 26 and the second zone 28; set temperatures for heating and cooling settings of respective ones of the first zone 26 and the second zone 28; and also configured to allow the vehicle operator and/or passengers to select operation in a recirculated air setting (recirculated air re-entering the passenger compartment 18) or a fresh air mode (fresh air entering the passenger compartment 18).

The controller 70 determines the status of the settings and conditions set via the first and second control panels 66 and 68 and uses those setting in the logic described below. One of the objects of the logic described below, is to operate the compressor 22 in a manner that prevents moisture from freezing on the cooling surfaces of either of the first evaporator 40 or the second evaporator 42 when only one of the first zone 26 and the second zone 28 is being cooled. In the air conditioning system 12 shown in FIGS. 2 and 3, the compressor 22 provides compressed refrigerant to both the first evaporator 40 and the second evaporator 42 in the absence of a control valve that might otherwise provide a means for stopping the flow of refrigerant to one or the other of the first evaporator 40 and the second evaporator 42. In other words, when only one of the first evaporator 40 and the second evaporator 42 is being used to provide cooling, both the first evaporator 40 and the second evaporator 42 are provided with compressed refrigerant from the compressor 22. The one of the first evaporator 40 and the second evaporator 42 that is not being used to cool air, can become very cold leading to possible ice forming on surfaces thereof. The logic presented below provides a way to limit and/or prevent ice from forming on the one of the first evaporator 40 and the second evaporator 42 that is not providing cooling.

A description of operation of the controller 70 is provided with respect to FIGS. 5-9.

Description of Flowcharts

A description of one example of control logic used by the controller 70 is now provided with specific reference to FIGS. 5-9. For the sake of simplicity, in the description below, all descriptions regarding the controller 70 determining whether or not a request for cooling of the first zone 26 has been set, include that cooling has been requested or set via the first control panel 66, and that the first fan 50 has been set to operate and blow air through the first air handler 46. Similarly, all descriptions regarding the controller 70 determining whether or not a request for cooling of the second zone 28 has been set, include that cooling has been requested or set via the second control panel 68, and that the second fan 52 has been set to operate and blow air through the second air handler 48.

Figure 5:
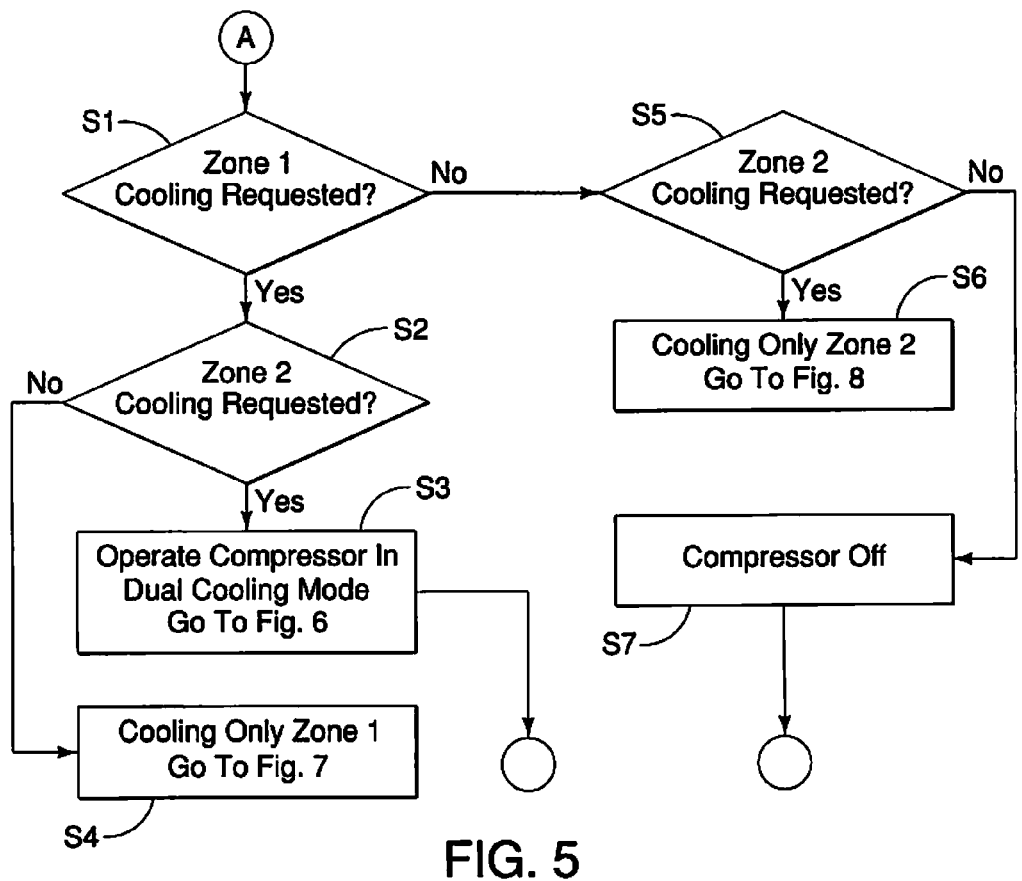
FIG. 5 is a first flowchart showing a logic steps conducted by the controller in the operation of the air conditioning system in accordance with the first embodiment.

In FIG. 5 at step S1, the controller 70 determines whether or not cooling has been requested or set using one of the first control panel 66 and the second control panel 68 for the first zone 26. If cooling has been requested for the first zone 26, then operation moves to step S2. If cooling has not been requested for the first zone 26, then operation moves to step S5.

At step S2, the controller 70 determines whether or not cooling has been requested or set using one of the first control panel 66 and the second control panel 68 for the second zone 28. If cooling has been requested for the second zone 28, then operation moves to step S3. If cooling has not been requested for the second zone 28, then operation moves to step S4.

At step S3, since the controller 70 has determined that cooling has been requested for both the first zone 26 and the second zone 28, the air conditioning system 12 operates in a dual cooling mode, as is described in greater detail below with respect to FIG. 6. In the dual cooling mode, the operation of the compressor 22 is based upon the temperatures measured by a determined one of the first temperature sensor 60 and the second temperature sensor 62, as describe below with respect to FIG. 6.

At step S4, in response to the controller 70 determining that the first zone 26 is to be cooled and the second zone 28 is not to be cooled, the controller 70 moves to the logic steps shown in FIG. 7, as is described in greater detail below after completion of the description of the logic steps shown in FIGS. 5 and 6.

At step S5, the controller 70 determines whether or not cooling has been requested or set using one of the first control panel 66 and the second control panel 68 for the second zone 28. If cooling has not been requested for the second zone 28, then operation moves to step S7, where the controller 70 ceases cycling operation of the compressor 22 (compressor off). If cooling has been requested for the second zone 28, then operation moves to step S6.

At step S6, in response to the controller 70 determining that the first zone 26 is to not be cooled and the second zone 28 is to be cooled, the controller 70 moves to the logic steps shown in FIG. 8, as is described in greater detail below after completion of the description of the logic steps shown in FIGS. 6 and 7.

Figure 6:
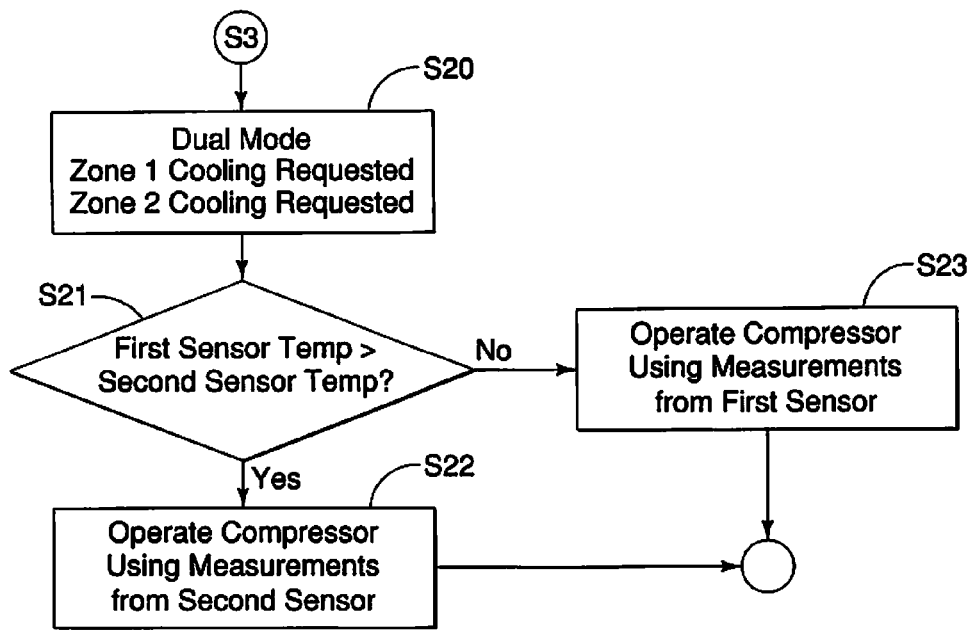
FIG. 6 is a second flowchart showing further logic steps conducted by the controller in the operation of the air conditioning system in accordance with the first embodiment.

The logic set forth in FIG. 6 is one example of how the controller 70 controls operation of the compressor 22 when the dual cooling mode has been selected. Specifically, in the dual cooling mode, cooling has been requested for both the first zone 26 and the second zone 28. Consequently, cooling air is blown past the first evaporator 40 via the first fan 50 and cooling air is blown past the second evaporator 42 via the second fan 52 in order to provide cooling for both the first zone 26 and the second zone 28. As with each of the operating modes, the compressor 22 provides compressed refrigerant to both the first evaporator 40 and the second evaporator 42, in the absence of any intervening valve(s).

Specifically, the operation of the compressor 22 is determined by the temperature of the colder of the two temperatures measured by the first temperature sensor 60 and the second temperature sensor 62. Specifically, if the first temperature sensor 60 measures a temperature less than the second temperature sensor 62, the measurements of the first temperature sensor 60 are used as a system temperature. If the first temperature sensor 60 measures a temperature greater than the second temperature sensor 62, the measurements of the second temperature sensor 62 are used as the system temperature. If the defined system temperature is greater than a predetermined evaporator cold parameter (a temperature predetermined as a minimal optimal operating temperature for the first and second evaporators 40 and 42), then the controller 70 engages the compressor 22 to compress refrigerant. If the defined system temperature is below the predetermined evaporator cold parameter, then the controller 70 dis-engages the compressor 22 so that it ceases compression of refrigerant. The controller 70 operates the air conditioning system 12 in the dual cooling mode until the controller 70 determines at steps S1, S2 and S3 of FIG. 5 that the cooling request settings have been changed by a passenger or vehicle operator.

At step S20 in FIG. 6, the controller 70 enters the dual cooling mode. At step S21, the controller 70 compares the temperature measurements from the first temperature sensor 60 (measuring temperature at the first evaporator 40) and the second temperature sensor 62 (measuring temperature at the second evaporator 42). If the temperature of the first temperature sensor 60 is greater than the temperatures of the second temperature sensor 62, then operation moves to step S22. If the temperature of the first temperature sensor 60 is less than or equal to the temperatures of the second temperature sensor 62, then operation moves to step S23.

At step S23, the controller 70 cycles the compressor 22 on and off based on the temperature measurements from the first temperature sensor 60 (the cooler of the two temperatures). Specifically, the controller 70 cycles the compressor 22 on and off in order to maintain the temperature in the first zone 26 and the second zone 28 based on the temperature measured at the first temperature sensor 60 such that air within the first zone 26 of the passenger compartment 16 is maintained within a range of temperatures corresponding to the settings entered via the first control panel 66. With this operating logic, the air in the second zone 28 of the passenger compartment 16 will likely be maintained within a temperature range similar or slightly higher than that of the first zone 26 (assuming windows are shut).

At step S22, the controller 70 cycles the compressor 22 on and off based on the temperature measurements from the second temperature sensor 62. Specifically, the controller 70 cycles the compressor 22 on and off in order to maintain the temperature measured in the second zone 28 and the first zone 26 based on the temperatures measured by the second temperature sensor 62 such that air within the second zone 28 of the passenger compartment 16 is maintained within a range of temperatures corresponding to the settings entered via the second control panel 68. With this operating logic, the air in the first zone 26 of the passenger compartment 16 will likely be maintained within a temperature range similar to or slightly higher than that of the second zone 28 (assuming windows are shut). Further, using the logic set forth in steps S21, S22 and S23, it is unlikely that either of the first and second evaporators 40 and 42 will experience freezing of moisture on cooling surfaces thereof since the level compression of refrigerant by the compressor 22 will be determined by the controller 70 using the temperature measured via the temperature sensor having the lower reading.

At the end of FIG. 6, operation returns to the logic in FIG. 5 for further iterations of the overall logic presented.

Figure 7:
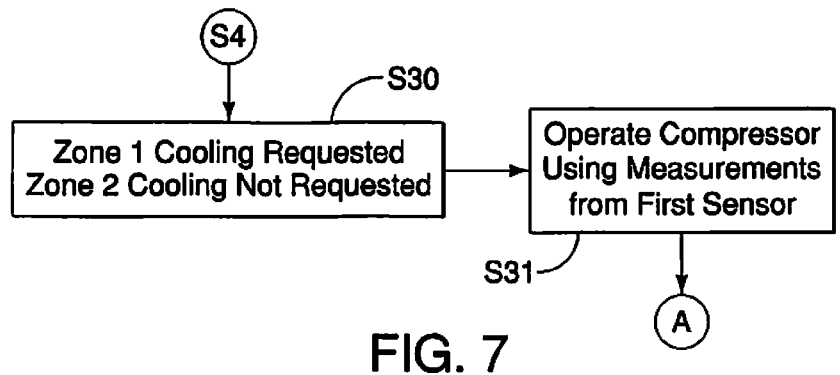
FIG. 7 is a third flowchart showing still further logic steps conducted by the controller in the operation of the air conditioning system in accordance with the first embodiment.

As mentioned above, at step S4 in FIG. 5, when only the first zone 26 is provided with cooling, operation moves to FIG. 7, and initially to step S30 in FIG. 7. At step S30, the controller 70 begins operating in a single zone operation mode. In the logic presented in FIG. 7, it is also assumed that the second fan 52 is off and is not blowing air across the cooling surfaces of the second evaporator 42.

At step S31, the controller 70 operates (cycles on and off) the compressor 22 using the temperature measurements made by the first temperature sensor 60. Thereafter, operation returns to the logic in FIG. 5 for further iterations of the logic.

Figure 8:
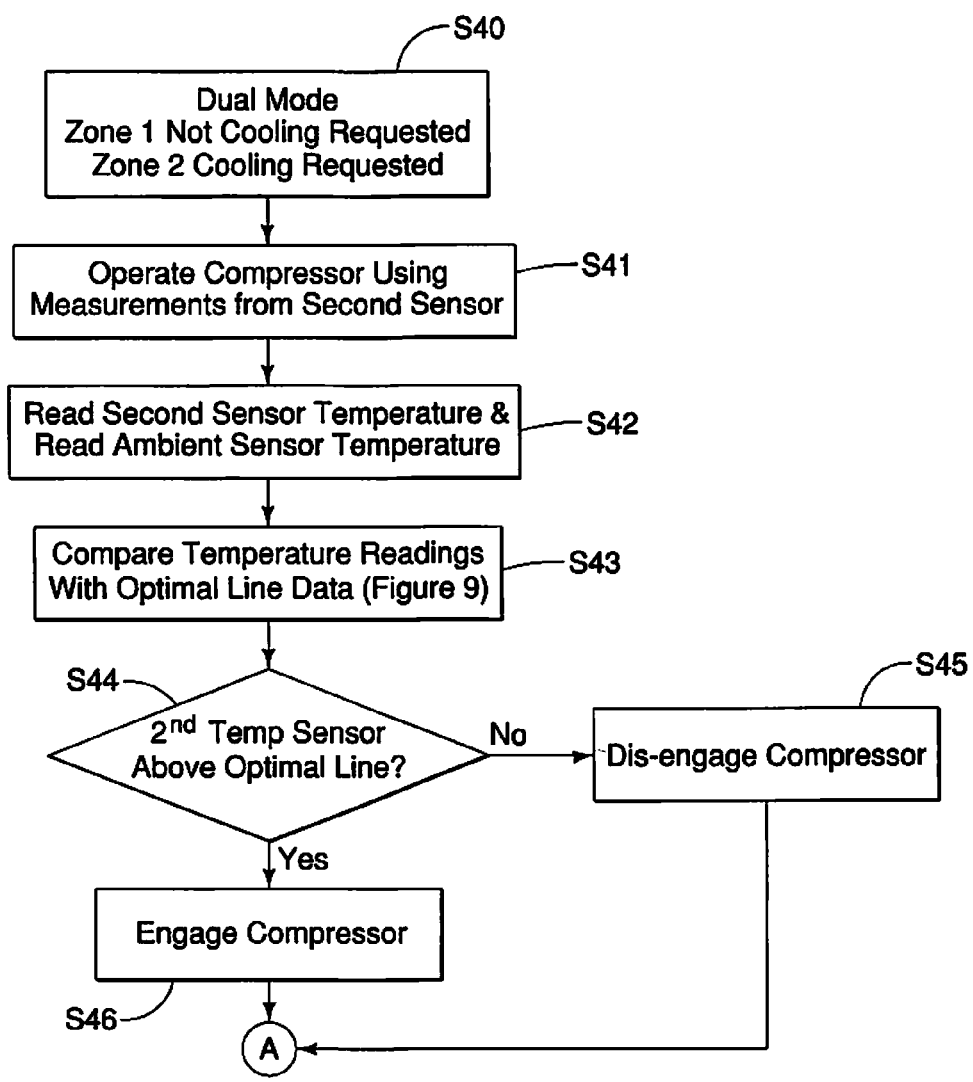
FIG. 8 is a fourth flowchart showing still further logic steps conducted by the controller in the operation of the air conditioning system in accordance with the first embodiment.

As mentioned above, at step S6 in FIG. 5, when only the second zone 28 is provided with cooling, operation moves to FIG. 8, and initially to step S40 in FIG. 8. At step S40, the controller 70 begins operating in a single zone operation mode. In the logic presented in FIG. 8, it is also assumed that the first fan 50 is off and is not blowing air across the cooling surfaces of the first evaporator 40.

At step S41, the controller 70 operates the compressor 22 based on the temperature measurements from the second temperature sensor 62 initially in a conventional manner, cycling the compressor 22 on and off such that the second evaporator 42 achieves a temperature that provides cooling to the second zone 28 of the passenger compartment 18 at the requested temperature. At step S42, the controller 70 continues monitoring signals from the second temperature sensor 62 but also monitors the measurements made by the ambient condition sensor 64, which in the first embodiment is a temperature sensor that measures temperature of air outside the passenger compartment 18 as it enters the vehicle 10. At step S43, the controller 70 compares the temperature read by the second temperature sensor 62 and the temperature measured by the ambient condition sensor 64 and evaluates the two temperatures with specific reference to the data represented in FIG. 9.

Figure 9:
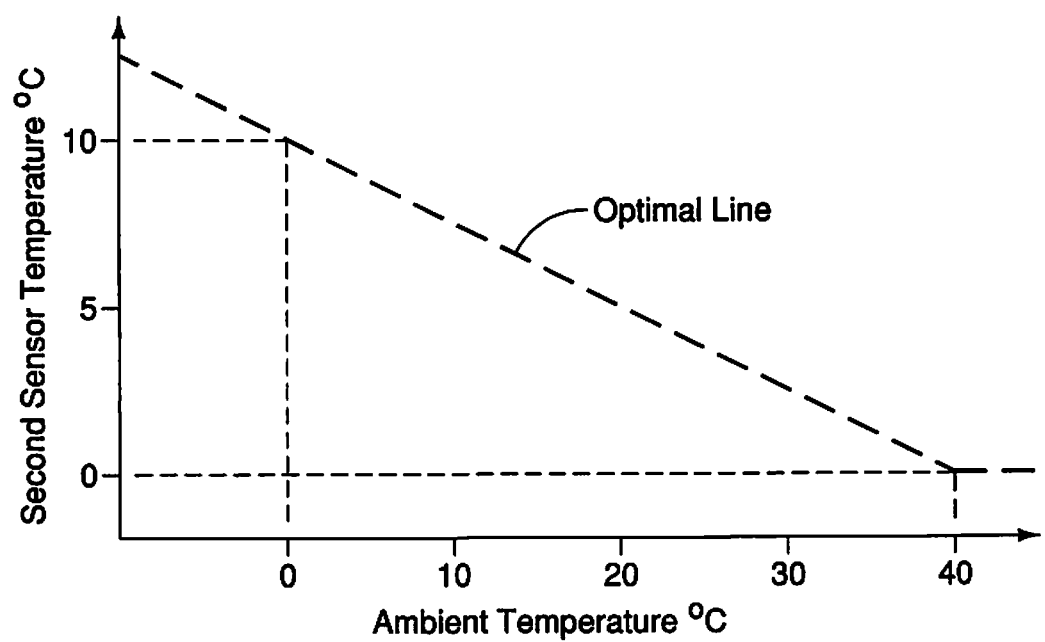
FIG. 9 is a chart is a representation of ambient temperature data with second evaporator temperature data showing an optimal line dividing combinations of temperature conditions that correspond to a high probability of ice forming on the first evaporator and temperature conditions that correspond to a low probability of ice forming on the first evaporator in accordance with the first embodiment.

The data depicted in FIG. 9 represents one example of accumulated data that shows the probability that frozen condensation (ice) could accumulate the first evaporator 40. Specifically, the data shown in FIG. 9 correlates temperature readings (X-axis) made by the ambient condition sensor 64, and temperature readings (Y-axis) made by the second temperature sensor 62. The inventors have determined that with the air conditioning system 12 in operating in the single zone operation mode (the second zone 28 only being cooled) at particular temperature combinations of the ambient condition sensor 64 and the second temperature sensor 62, the probability that ice will form on the first evaporator 40 is higher under certain circumstances and lower in other circumstances. Specifically, the Optimal Line in FIG. 9 represents an approximate boundary between temperatures at which the probability of ice formation is highly likely, and temperatures at temperatures at which the probability of ice formation is unlikely. The temperatures in the areas above and to the right of the Optimal Line in FIG. 9 represent conditions where the probability of ice formation is unlikely. The temperatures in the areas below and to the left of the Optimal Line in FIG. 9 represent conditions where the probability of ice formation on surfaces the first evaporator 40 is highly likely.

For example, when the temperature measured by the ambient condition sensor 64 is 10 degrees C. and temperature at the second evaporator 42 measured by the second temperature sensor 62 is above 10 degrees C., then the probability of ice formation is unlikely. However, when the temperature measured by the ambient condition sensor 64 is 10 degrees C. and temperature measured by the second temperature sensor 62 is at 5 degrees C., then the probability of ice formation is highly likely due to moisture condensing on surfaces of the first evaporator 40 and freezing, since no cooling has been requested for the first zone 26.

Similarly, when the temperature measured by the ambient condition sensor 64 is 30 degrees C. and temperature at the second evaporator 42 measured by the second temperature sensor 62 is above 5 degrees C., then the probability of ice formation is unlikely. However, when the temperature measured by the ambient condition sensor 64 is 30 degrees C. and temperature measured by the second temperature sensor 62 is at 0 degrees C., then the probability of ice formation is highly likely due to moisture condensing on surfaces of the first evaporator 40 and freezing, since no cooling has been requested for the first zone 26.

Thus any coordinate pairs defined by the temperatures measured by the ambient condition sensor 64 and the second temperature sensor 62 on the chart in FIG. 9, that fall above or to the left of the Optimal Line represent a low probability of condensation on the first evaporator 40 freezing. Any coordinate pairs defined by the temperatures measured by the ambient condition sensor 64 and the second temperature sensor 62 on the chart in FIG. 9, that fall below or to the right of the Optimal Line represent a high probability of condensation on the first evaporator 40 freezing.

The Optimal Line in FIG. 9 itself represents temperature combinations at which the most cooling can be provided to the second zone 26 without a high probability of condensation on the first evaporator 40 freezing.

Returning to FIG. 8, at step S44, after evaluating the two temperatures (measured by the ambient condition sensor 64 and the second temperature sensor 62), the controller 70 determines whether or not the temperature of the second temperature sensor 62 lies above the Optimal Line in FIG. 9. At step S44, if the temperature of the second temperature sensor 62 lies below the Optimal Line in FIG. 9, then the controller 70 ceases operation of the compressor 70. At step S44, if the temperature of the second temperature sensor 62 lies above the Optimal Line in FIG. 9, then operation moves to step S46 where the compressor 22 can continue to be cycled on and off based upon the temperature readings from the second temperature sensor 62. After both steps S45 and S46, operation returns to the circle A in FIG. 5 for repeated iterations of the logic set forth in the flowcharts.

In the depicted embodiment, the vehicle 10 is primarily configured for use as a taxi. Vehicle operators driving a taxi, often do not desire or want to be cooled by the air conditioning system 12. However, passengers riding in the second zone 28 of the vehicle 10 (a taxi), usually want cooling on a hot day. There is no refrigerant flow valve that can restrict refrigerant flow to either of the first and second evaporators 40 and 42. Specifically, the first and second evaporators 40 and 42 are simultaneously and approximately equally provided with a flow of compressed refrigerant from the condenser 24 (and hence from the compressor 22). The logic presented in FIGS. 5-9 provides a simple way to prevent moisture and ice build-up on either one of the first evaporator 40, when only the second evaporator 42 is needed to provide cooling. Further, since there is no refrigerant flow valve that can restrict refrigerant flow to either of the first and second evaporators 40 and 42, cost of manufacturing is reduced and there is one less mechanical component of the air conditioning system 12 to maintain and repair.

Hence, the air conditioner 12 is able to operate such that the condenser 24 is connected to the expansion device 40a of the first evaporator 40 and the expansion device 42a of the second evaporator 42 supplying an uninterrupted flow of cooled compressed refrigerant to both the first expansion device 40a and the second expansion device 42a while the compressor 22 is operating in the absence of any intervening valve or flow interruption device.

Second Embodiment

Figure 10:
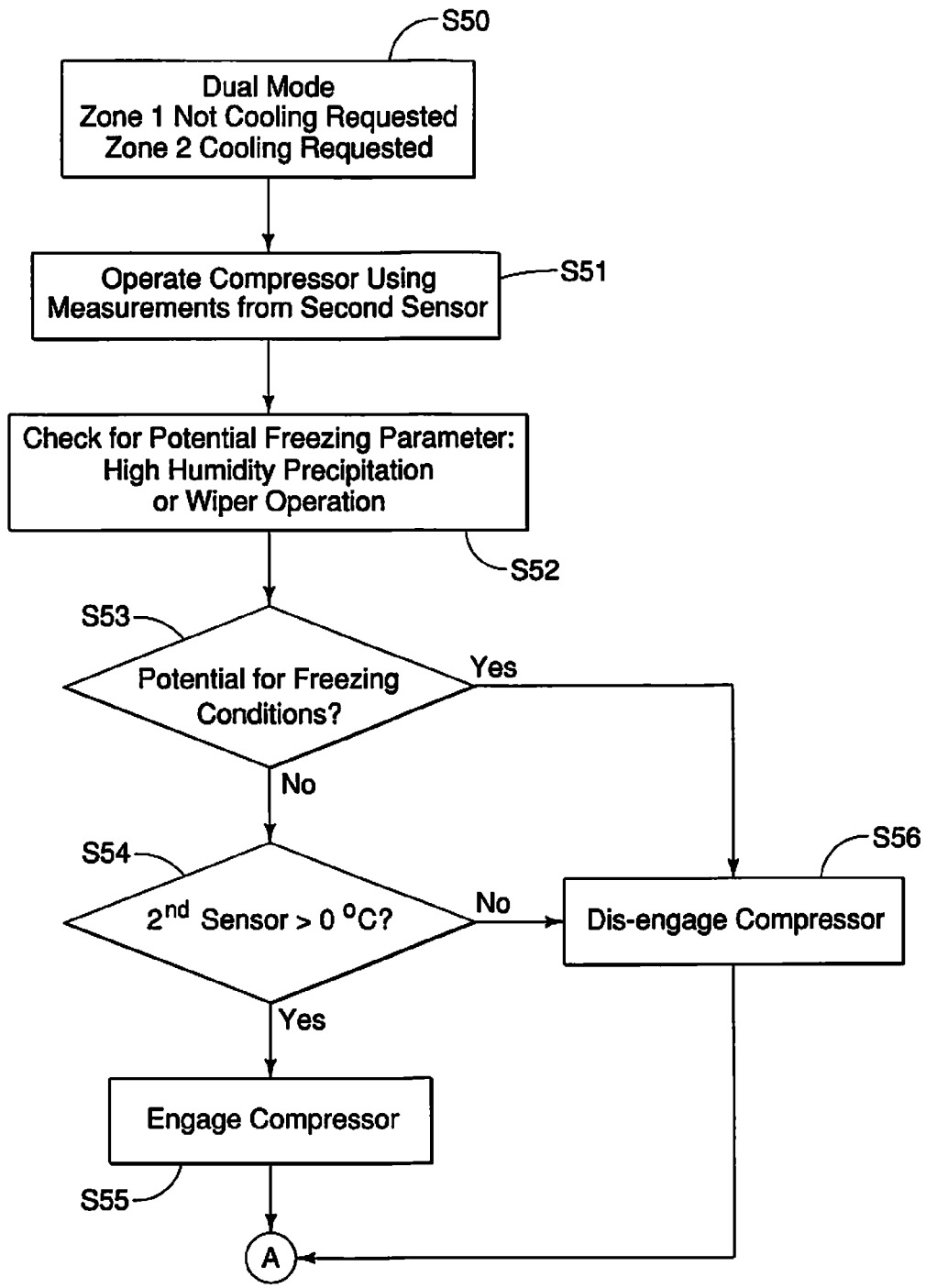
FIG. 10 is a flowchart showing logic steps conducted by the controller in the operation of the air conditioning system in accordance with a second embodiment.

Referring now to FIG. 10, a flowchart of operations conducted by the controller 70 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the air conditioning system 12 is as described above with respect to FIGS. 2, 3 and 4, except that the ambient condition sensor 64 detects humidity of air outside the vehicle 10 as it enters the first air handler 46.

Further in the second embodiment, all operations as described above with respect to the flowcharts in FIGS. 5, 6 and 7 are as described above, except that in step S6 in FIG. 5, operation moves to the logic set forth in FIG. 10 instead of the logic set forth in FIG. 8.

When operations move to step S5 in FIG. 5, the controller 70 moves to step S50 in FIG. 10. At step S50 in FIG. 10, only the second zone 28 is provided with cooling and the controller 70 begins operating in a single zone operation mode. In the logic presented in FIG. 10, it is also assumed that the first fan 50 is off and is not blowing air across the cooling surfaces of the first evaporator 40.

At step S51, the controller 70 operates the compressor 22 based on the temperature measurements from the second temperature sensor 62 initially in a conventional manner, cycling the compressor 22 on and off such that the second evaporator 42 achieves a temperature that provides cooling to the second zone 28 of the passenger compartment 18 at the requested temperature. At step S52, the controller 70 continues monitoring signals from the second temperature sensor 62 but also monitors at least one of the following:

the measurements made by the ambient condition sensor 64, which in the second embodiment is a humidity sensor that measures humidity levels of air outside the passenger compartment 18 as it enters the vehicle 10; or indications of precipitation (rain or snow) such as, for instance, windshield wipers are currently on.

At step S53, the controller 70 evaluates the conditions detected in step S52. For example, if the controller 70 determines that the humidity level detected by the ambient condition sensor 64 is below than a predetermined level, then the controller 70 determines that the probability of moisture freezing on surfaces of the first evaporator 40 is low, and the controller 70 moves to step S54. Similarly, if the controller 70 determines that there are no indications of precipitation, such as the windshield wipers being off, then the controller 70 further determines that the probability of moisture freezing on surfaces of the first evaporator 40 is low, and the controller 70 moves to step S54.

If the controller 70 determines that the humidity level detected by the ambient condition sensor 64 is greater than the predetermined level, then the controller 70 determines that the probability of moisture freezing on surfaces of the first evaporator 40 is high, and the controller 70 moves to step S56. Similarly, if the controller 70 determines that there are indications of precipitation, such as the windshield wipers being on, then the controller 70 further determines that the probability of moisture freezing on surfaces of the first evaporator 40 is high, and the controller 70 moves to step S56.

At step S54, the controller 70 evaluates the temperature measurements from the second temperature sensor 62. If the measurements from the second temperature sensor 62 are greater than 0 degrees C., then operation moves to step S55, where the compressor 22 is engaged to compress refrigerant. If the measurements from the second temperature sensor 62 are not greater than 0 degrees C., then operation moves to step S56, where the compressor 22 is dis-engaged and does not compress refrigerant.

After each of steps S55 and S56, operation returns to FIG. 5 for continuing repeated iterations of the logic, as indicated by the circle A.

Hence, the air conditioner 12 in accordance with the second embodiment is able to operate such that the condenser 24 is connected to the expansion device 40a of the first evaporator 40 and the expansion device 42a of the second evaporator 42 supplying an uninterrupted flow of cooled compressed refrigerant to both the first expansion device 40a and the second expansion device 42a while the compressor 22 is operating in the absence of any intervening valve or flow interruption device.

The controller 70 preferably includes a microcomputer with an air conditioning control program that controls the air conditioning system 12. The controller 70 can also include other conventional components such as an input interface circuit, an output interface circuit, and storage devices such as a ROM (Read Only Memory) device and a RAM (Random Access Memory) device. The microcomputer of the controller 70 is programmed to control the air conditioning system 12. The controller 70 is operatively coupled to the various elements of the air conditioning system 12 in a conventional manner. It will be apparent to those skilled in the art from this disclosure that the precise structure and algorithms for the controller 70 can be any combination of hardware and software that will carry out the functions of the present invention.

The various vehicle features are conventional components that are well known in the art. Since such vehicle related features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle air conditioning system. Accordingly, these terms, as utilized to describe the present invention should be interpreted relative to a vehicle equipped with the vehicle air conditioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for operating a vehicle air conditioning system, comprising:
   providing a first evaporator configured to cool a first zone within a vehicle, the first evaporator having an automatic expansion device;
   providing a second evaporator configured to cool a second zone within the vehicle, the second evaporator having an automatic expansion device;
   a condenser directly connected to the automatic expansion device of the first evaporator and the automatic expansion device of the second evaporator;
   providing a compressor within the vehicle that is configured to provide compressed refrigerant to the condenser, the condenser being directly connected to both the automatic expansion device of the first evaporator and the automatic expansion device of the second evaporator in an absence of any intervening valve or flow interruption device such that with the compressor operating, the condenser supplies an uninterrupted flow of cooled compressed refrigerant to both the automatic expansion device of the first evaporator and the automatic expansion device of the second evaporator;
   providing a first sensor that measures temperature at the first evaporator;
   providing a second sensor that measures temperature at the second evaporator;
   providing a device consisting of one selected from the group of devices including: 1) an ambient temperature sensor connected to the controller and positioned to detect temperature of air outside the vehicle; 2) a humidity sensor connected to the controller and positioned to detect humidity of air outside the vehicle; and 3) windshield wipers connected to the controller,
      wherein 1) with the device being the ambient temperature sensor, temperature of ambient air measured by the ambient temperature sensor in combination with temperature measured by the second sensor define low probability and high probability of the first evaporator accumulating frozen moisture on surfaces thereof, where high probability is defined when the temperature of ambient air is above a predetermined level relative to the temperature measured by the second sensor, and low probability is defined when the temperature of ambient air is below a predetermined amount relative to the temperature measured by the second sensor,
      2) with the device being the humidity sensor, humidity of ambient air measured by the humidity sensor defines low probability and high probability of the first evaporator accumulating frozen moisture on surfaces thereof, where high probability is defined when the humidity of ambient air is above a predetermined level, and low probability is defined when the humidity of ambient air is below a predetermined level,
      3) with the device being the windshield wipers, high probability is defined when the windshield wipers are on, and low probability is defined when the windshield wipers are off;
   setting an operating mode via a control panel where the operating mode is selected from a normal operating mode where cooling is provided to both the first zone and the second zone, and a single zone cooling mode where the first zone is not cooled, and the second zone is cooled; and
   providing a controller that is connected to the first sensor, the second sensor, the compressor and the control panel, such that
   in response to the normal cooling mode being selected via the control panel the controller operates the compressor in response to temperature measurements from one or both of the first sensor and the second sensor, and
   in response to the single zone cooling mode being selected for cooling via the control panel, the compressor being operated by the controller in response to temperature measurements from the second sensor and further in response to the controller determining that the first evaporator has low probability of accumulating frozen moisture on surfaces thereof, and, the compressor not being operated in response to the controller determining high probability of accumulating frozen moisture on surfaces of the first evaporator.

2. The method according to claim 1, wherein
the providing of the controller further includes the controller operating a first fan that moves air past surfaces of the first evaporator into the first zone in the normal mode and not operating the first fan in the single zone cooling mode, and the providing of the controller includes the controller operating a second fan that moves air past surfaces of the second evaporator into the second zone in the normal mode and in the single zone cooling mode.

3. The method according to claim 1, wherein
the setting of the operating mode via the control panel includes selection of a second single zone cooling mode where the second zone is not cooled and the first zone is cooled, wherein the compressor operated by the controller in response to temperature measurements from the first sensor.

4. The method according to claim 1, further comprising
the providing of the device includes the device being the ambient temperature sensor.

5. The method according to claim 1, further comprising
the providing of the device includes the device being the humidity sensor.

6. The method according to claim 1, wherein
the providing of the device includes the device being the windshield wipers.

7. A vehicle air conditioning system comprising
a first evaporator configured to provide cooling to a first zone within a vehicle, the first evaporator having an automatic expansion device;
a second evaporator configured to provide cooling to a second zone within the vehicle, the second evaporator having an automatic expansion device;
a condenser directly connected to the automatic expansion device of the first evaporator and the automatic expansion device of the second evaporator;
a compressor configured to provide compressed refrigerant to the condenser, the condenser being directly connected to both the automatic expansion device of the first evaporator and the automatic expansion device of the second evaporator in an absence of any intervening valve or flow interruption device such that with the compressor operating, the condenser supplies an uninterrupted flow of cooled compressed refrigerant to both the automatic expansion device of the first evaporator and the automatic expansion device of the second evaporator;
a first sensor that measures temperature at the first evaporator;
a second sensor that measures temperature at the second evaporator;
a device consisting of one selected from the group of devices including: 1) a humidity sensor positioned to detect humidity of air outside the vehicle; and 2) windshield wipers,
wherein 1) with the device being the humidity sensor, humidity of ambient air measured by the humidity sensor defines low probability and high probability of the first evaporator accumulating frozen moisture on surfaces thereof, where high probability is defined when the humidity of ambient air is above a predetermined level, and low probability is defined when the humidity of ambient air is below a predetermined amount, and
2) with the device being the windshield wipers, high probability is defined when the windshield wipers are on, and low probability is defined when the windshield wipers are off;
a control panel configured to manually receive air conditioning operation settings, including separate settings for cooling of the first zone and settings for cooling of the second zone; and a controller connected to the first sensor, the second sensor, the compressor, the device, and the control panel, the controller being configured to operate the compressor in a plurality of differing modes, including:
a normal cooling mode where cooling of both the first zone and the second zone is requested via the control panel, such that the compressor is operated by the controller in response to temperature measurements from one or both of the first sensor and the second sensor, and
a single zone cooling mode in which cooling of only the second zone is requested via the control panel, the compressor being operated by the controller in response to temperature measurements from the second sensor and further in response to the controller determining that the first evaporator has a low probability of accumulating frozen moisture on surfaces thereof, and the compressor not being operated by the controller in response to the controller determining high probability of accumulating frozen moisture on surfaces of the first evaporator.

8. A vehicle air conditioning system, comprising:
a first evaporator configured to provide cooling to a first zone within a vehicle, the first evaporator having an automatic expansion device;
a second evaporator configured to provide cooling to a second zone within the vehicle, the second evaporator having an automatic expansion device;
a condenser directly connected to the automatic expansion device of the first evaporator and the automatic expansion device of the second evaporator;
a compressor configured to provide compressed refrigerant to the condenser, the condenser being directly connected to both the automatic expansion device of the first evaporator and the automatic expansion device of the second evaporator in an absence of any intervening valve or flow interruption device such that with the compressor operating, the condenser supplies an uninterrupted flow of cooled compressed refrigerant to both the automatic expansion device of the first evaporator and the automatic expansion device of the second evaporator;
a first sensor that measures temperature at the first evaporator;
a second sensor that measures temperature at the second evaporator;
an ambient temperature sensor positioned to detect temperature of air outside the vehicle such that temperature of ambient air measured by the ambient temperature sensor in combination with temperature measured by the second sensor define low probability and high probability of the first evaporator accumulating frozen moisture on surfaces thereof, where high probability is defined when the temperature of ambient air is above a predetermined level relative to the temperature measured by the second sensor, and low probability is defined when the temperature of ambient air is below a predetermined level relative to the temperature measured by the second sensor;
a control panel configured to manually receive air conditioning operation settings, including separate settings for cooling of the first zone and settings for cooling of the second zone; and
a controller connected to the first sensor, the second sensor, the compressor, the ambient temperature sensor, and the control panel, the controller being configured to operate the compressor in a plurality of differing modes, including:

a normal cooling mode where cooling of both the first zone and the second zone is requested via the control panel, such that the compressor is operated by the controller in response to temperature measurements from one or both of the first sensor and the second sensor, and a single zone cooling mode in which cooling of only the second zone is requested via the control panel, the compressor being operated by the controller in response to temperature measurements from the second sensor and further in response to the controller determining that the first evaporator has low probability of accumulating frozen moisture on surfaces thereof, and the compressor not being operated by the controller in response to the controller determining high probability of accumulating frozen moisture on surfaces of the first evaporator.

9. The vehicle air conditioning system according to claim 8, further comprising a first fan configured to move air past surfaces of the first evaporator into the first zone; and a second fan configured to move air past surfaces of the second evaporator into the second zone, and the control panel is further configured to separately receive manually set speeds for each of the first fan and the second fan.

10. The vehicle air conditioning system according to claim 8, wherein the controller includes data based upon temperature measured by the ambient temperature sensor and temperature measured by the second sensor, the data providing information related to high probability and low probability of the first evaporator accumulating frozen moisture on surfaces thereof.

11. The vehicle air conditioning system according to claim 8, wherein the first zone is a portion of a passenger compartment of the vehicle that includes a vehicle operators' area, and the second zone is a portion of the passenger compartment that includes seating for passengers and is rearward of the first zone.

12. The vehicle air conditioning system according to claim 11, wherein the vehicle includes a partition separating the first zone from the second zone.

13. The vehicle air conditioning system according to claim 8, wherein the controller is further configured to operate the compressor in a second single zone cooling mode in which cooling of only the first zone is requested via the control panel, the compressor operated by the controller in response to temperature measurements from the first sensor.

14. The vehicle air conditioning system according to claim 13, wherein the vehicle includes a partition separating the first zone from the second zone.

* * * * *